United States Patent
Nayar et al.

(10) Patent No.: US 7,644,493 B2
(45) Date of Patent: Jan. 12, 2010

(54) ADJUSTABLE HEAD STACK COMB

(75) Inventors: Sham S. Nayar, Shakopee, MN (US);
John G. Gerogeorge, Chanhassen, MN (US); Craig A. Parsons, Victoria, MN (US); Ronald J. Smith, Chaska, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 393 days.

(21) Appl. No.: 10/884,210

(22) Filed: Jul. 2, 2004

(65) Prior Publication Data
US 2006/0002028 A1 Jan. 5, 2006

(51) Int. Cl.
*B23P 19/04* (2006.01)

(52) U.S. Cl. .......................... 29/737; 29/729; 269/199; 269/229; 360/265.7

(58) Field of Classification Search .................. 29/729, 29/737, 603.03; 360/251.3, 265.7, 265.9; 403/314; 269/196–200, 229, 157; 901/39, 901/40, 31, 36; 188/329, 330
See application file for complete search history.

(56) References Cited

U.S. PATENT DOCUMENTS

| 528,968 | A | * | 11/1894 | Peabody ................. 269/157 X |
| 1,246,563 | A | * | 11/1917 | Dessez et al. ............... 269/196 |
| 3,827,685 | A | * | 8/1974 | Wennes ....................... 269/229 |
| 4,482,289 | A | * | 11/1984 | Inaba et al. ............... 901/39 X |
| 4,696,501 | A | | 9/1987 | Webb |
| 4,981,200 | A | * | 1/1991 | Gee ....................... 188/330 X |
| 5,465,476 | A | | 11/1995 | Krajec |
| 5,540,542 | A | | 7/1996 | Krajec |
| 6,091,577 | A | | 7/2000 | Ho |
| 6,321,442 | B1 | | 11/2001 | Berberich |
| 6,625,870 | B1 | | 9/2003 | Heeren |
| 6,693,773 | B1 | | 2/2004 | Sassine |
| 2004/0025326 | A1 | | 2/2004 | Pfeiffer |

FOREIGN PATENT DOCUMENTS

JP 7-334953 * 12/1995

* cited by examiner

*Primary Examiner*—A. Dexter Tugbang
(74) *Attorney, Agent, or Firm*—Westman, Champlin & Kelly, P.A.

(57) ABSTRACT

The application discloses an adjustable head stack comb having adjustable first and second comb plates. The adjustable comb plates include at least one tooth segment which cooperatively form a comb having at least one tooth. The first and second comb plates are adjusted to adjust dimensions of the at least one tooth cooperatively formed by the tooth segments of the first and second comb plates. In the embodiments disclosed, a relative position of the first and second comb plates is adjusted to adjust a thickness dimension of the at least one tooth formed by the at least one tooth segments of the first and second comb plates. Also in illustrated embodiments, the comb plates are cooperatively adjusted to adjust an elevation or z-height of the at least one tooth of the comb.

18 Claims, 11 Drawing Sheets

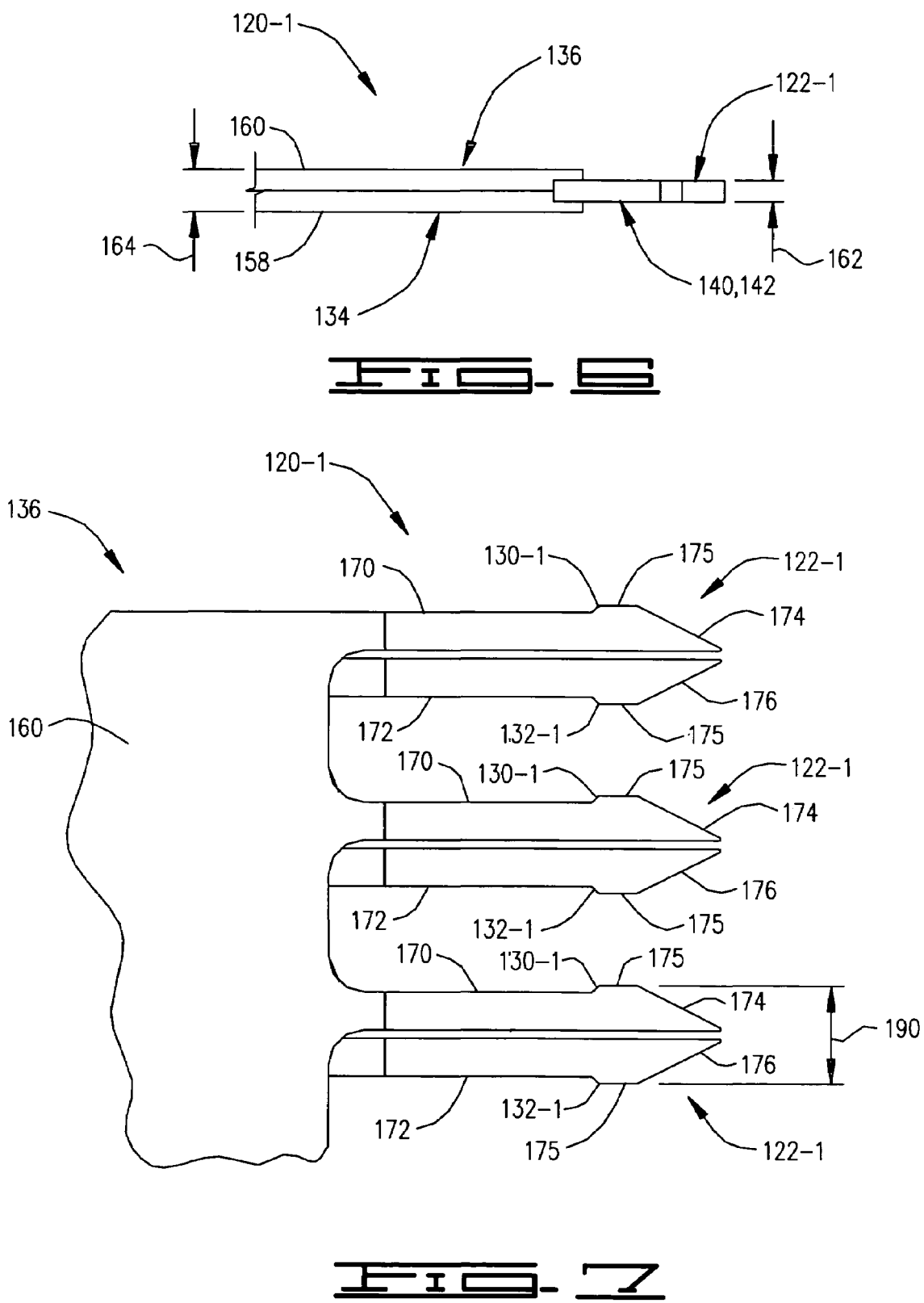

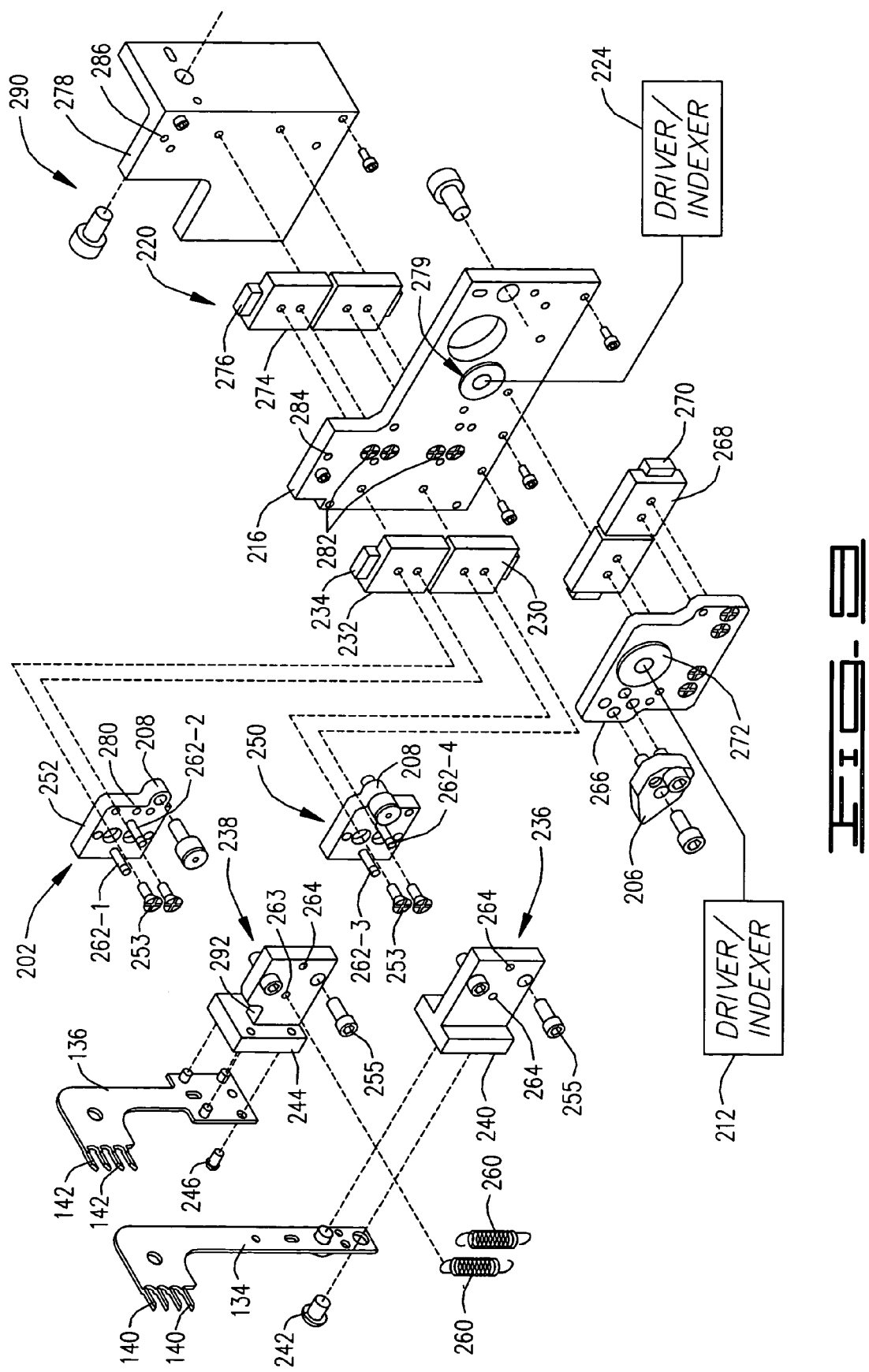

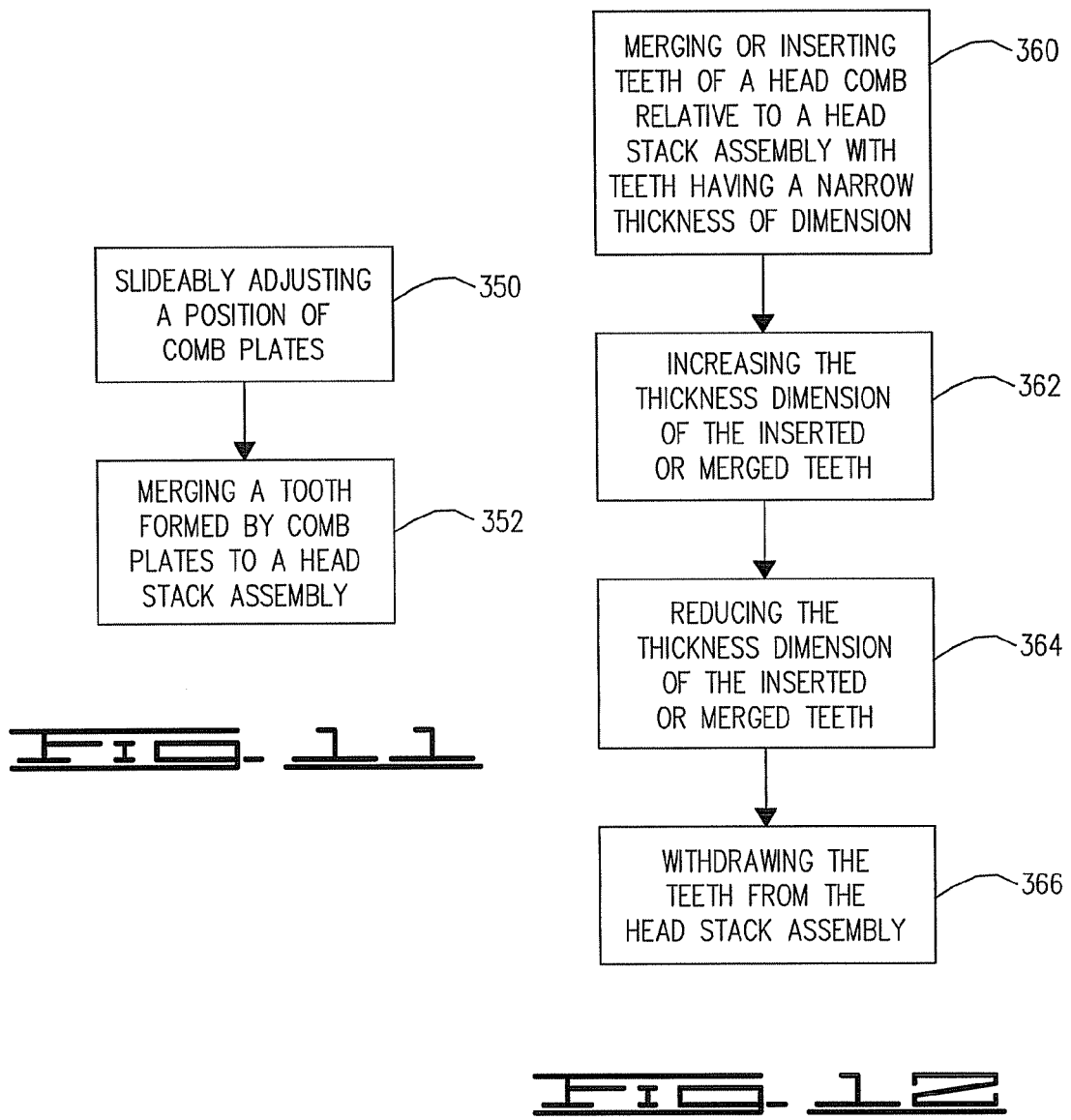

ADJUSTABLE HEAD STACK COMB

FIELD OF THE INVENTION

The present invention relates generally to a head stack comb and more particularly but not by limitation to an adjustable head stack comb.

BACKGROUND OF THE INVENTION

Data storage devices include heads to read digitally encoded information from a disc or data storage medium and/or write digitally encoded information to the disc or data storage medium. Heads are typically coupled to an actuator or E-block to form a head stack assembly including a plurality of heads to read information from or write information to a plurality of discs of a disc stack. The plurality of heads of the head stack assembly are merged with the plurality of discs of the disc stack to read data from and/or write data to the plurality of discs of the disc stack.

Heads are coupled to the E-block or actuator via a plurality of suspension assemblies or suspension arms. Typically, the head includes an air bearing slider to provide a dynamic fly height (along a z-axis) for the head above the disc surface. The head or slider is coupled to the suspension assembly or suspension arm via a gimbal spring or gimbal device to allow the head or slider to pitch and roll relative to a load point of the suspension assembly to follow the topography of the disc surface. The head and gimbal spring collectively form a head gimbal assembly and the head and suspension collectively form a head suspension assembly.

Manufacturing tolerance variations can introduce variations to static dimensions of the suspension assembly and head. For example manufacturing tolerance variations can introduce variations to pitch static attitude (PSA), roll static attitude (RSA) or z-height parameters of the head or slider. PSA and RSA can vary based upon variations in flexure or relative stiffness of suspension components. Variations in PSA and RSA parameters can affect pitch, roll and z-height parameters of the head or slider relative to the disc surface and fly height parameters for read or write operations of the data storage device.

To control manufacturing tolerance variations, static dimensions, such as PSA and RSA are measured. For measurement, a head stack comb assembly is used to hold suspension arms relative to a static measurement position corresponding to an elevational or z-height of the head or suspension assembly after loaded or merged with a disc. Head stack combs include a plurality of teeth having a thickness dimension sized to hold the suspension arms relative to the static measurement position of the head or assembly. Accuracy of the thickness dimension of the teeth and position and elevation thereof is important for accurate measurement.

For example, static measurements can vary depending upon the height at which the suspension arm is held by the teeth of the comb. Determining optimum dimensions of the comb and thickness of the comb teeth is difficult. Manufacturing a variety of combs having different tooth dimensions and parameters can be tedious and expensive. The present invention addresses these and other problems and offers solutions not previously recognized nor appreciated.

SUMMARY OF THE INVENTION

The present invention relates to an adjustable head stack comb. The adjustable head stack comb includes first and second adjustable comb plates including at least one tooth segment which cooperatively form a comb having at least one tooth. The first and second comb plates are adjusted to adjust dimensions of the at least one tooth cooperatively formed by the tooth segments of the first and second comb plates. In the embodiments disclosed, a relative position of the first and second comb plates is adjusted to adjust a thickness dimension of the at least one comb tooth formed by the tooth segments of the first and second comb plates. Also in illustrated embodiments, the comb plates are cooperatively adjusted to adjust an elevation or z-height of the at least one comb tooth. In an illustrated embodiment, tooth segments of the comb plates are offset in opposed directions to cooperatively provide a low profile for the tooth formed by tooth segments of the first and second comb plates. Other features and benefits that characterize embodiments of the present invention will be apparent upon reading the following detailed description and review of the associated drawings.

BRIEF DESCRIPTION OF THE DRAWINGS

FIGS. 5-6 illustrate an embodiment of comb plates which include teeth segments offset from a body portion of the comb plates.

FIG. 7 is a detailed illustration of teeth segments of comb plates which cooperatively form teeth of a head stack comb.

FIG. 9 is an exploded view of the embodiment of the head stack comb assembly of FIG. 8.

FIG. 10-B is a detailed illustration of an indexer cylinder and screw assembly.

FIG. 10-C is a sectional view of the indexer illustrated in FIG. 10-A.

FIG. 11 is a flow chart illustrating use or adjustment of the adjustable head stack comb.

FIG. 12 is a flow chart illustrating operating steps for adjusting tooth thickness for insertion and withdrawal relative to a head stack assembly.

DETAILED DESCRIPTION OF ILLUSTRATIVE EMBODIMENTS

Figure 1:
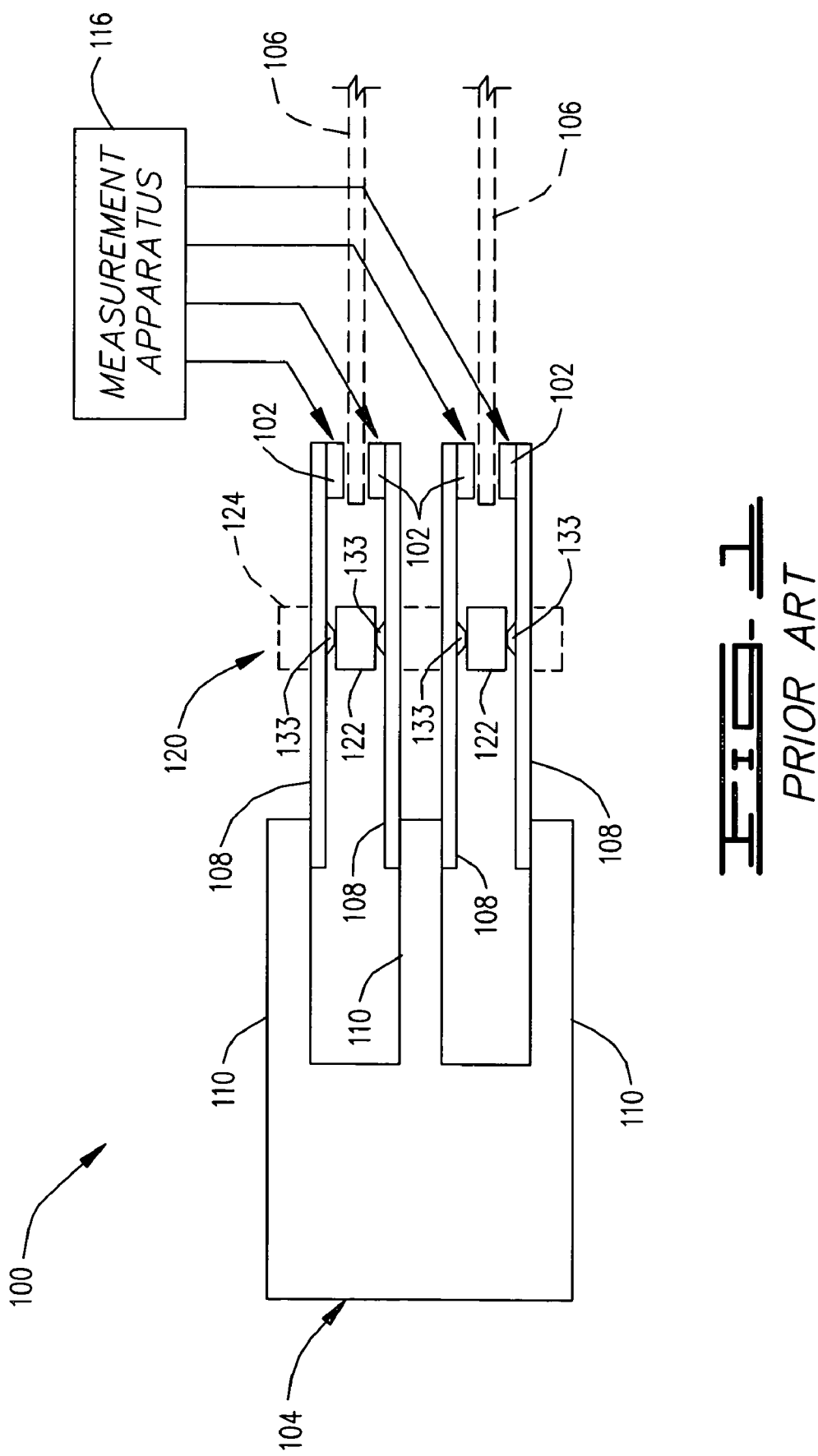
FIG. 1 is a schematic illustration of a head stack assembly and head stack comb.

The present invention relates to a head stack comb which has application for head stack assemblies for a data storage device or servo track writer apparatus, such as a multi-disc writer (MDW). In particular, the head stack comb has application for measuring and manufacturing head stack assemblies for data storage devices, although application is not so limited. FIG. 1 schematically illustrates an embodiment of a head stack assembly 100. The head stack assembly 100 includes a plurality of heads 102 coupled to an E-block or actuator block 104. Heads 102 of the head stack assembly 100 are positioned relative discs 106 (illustrated in phantom in FIG. 1) or other media for read/write operations.

The heads 102 are coupled to the E-block 104 via suspension arms or assemblies 108 coupled to actuator arms 110 of the E-block 104. Heads 102 are coupled to the suspension arms 108 via a gimbal spring (not shown) to form a head suspension assembly. The head and gimbal spring are collectively referred to as a head gimbal assembly (HGA). In the illustrated embodiment, the E-block 104 includes a plurality of actuator arms 110 having a plurality of head suspension assemblies or arms 108 coupled thereto to read or write data to a plurality of discs 106 (illustrated in phantom in FIG. 1) of a disc stack although application is not so limited.

Typically, the head 102 includes an air bearing slider to provide a dynamic fly height for the head 102 above the disc surface. The head 102 or slider is coupled to the suspension arm 108 via the gimbal spring or gimbal device to allow the head 102 or slider to pitch and roll relative to a load point of the head suspension assembly to follow the topography of the disc surface. Manufacturing tolerance variations can introduce variations to the static dimensions of the head and head gimbal assemblies. For example, PSA, RSA and z-height parameters can vary based upon manufacturing processes and manufacturing tolerances.

Figure 2:
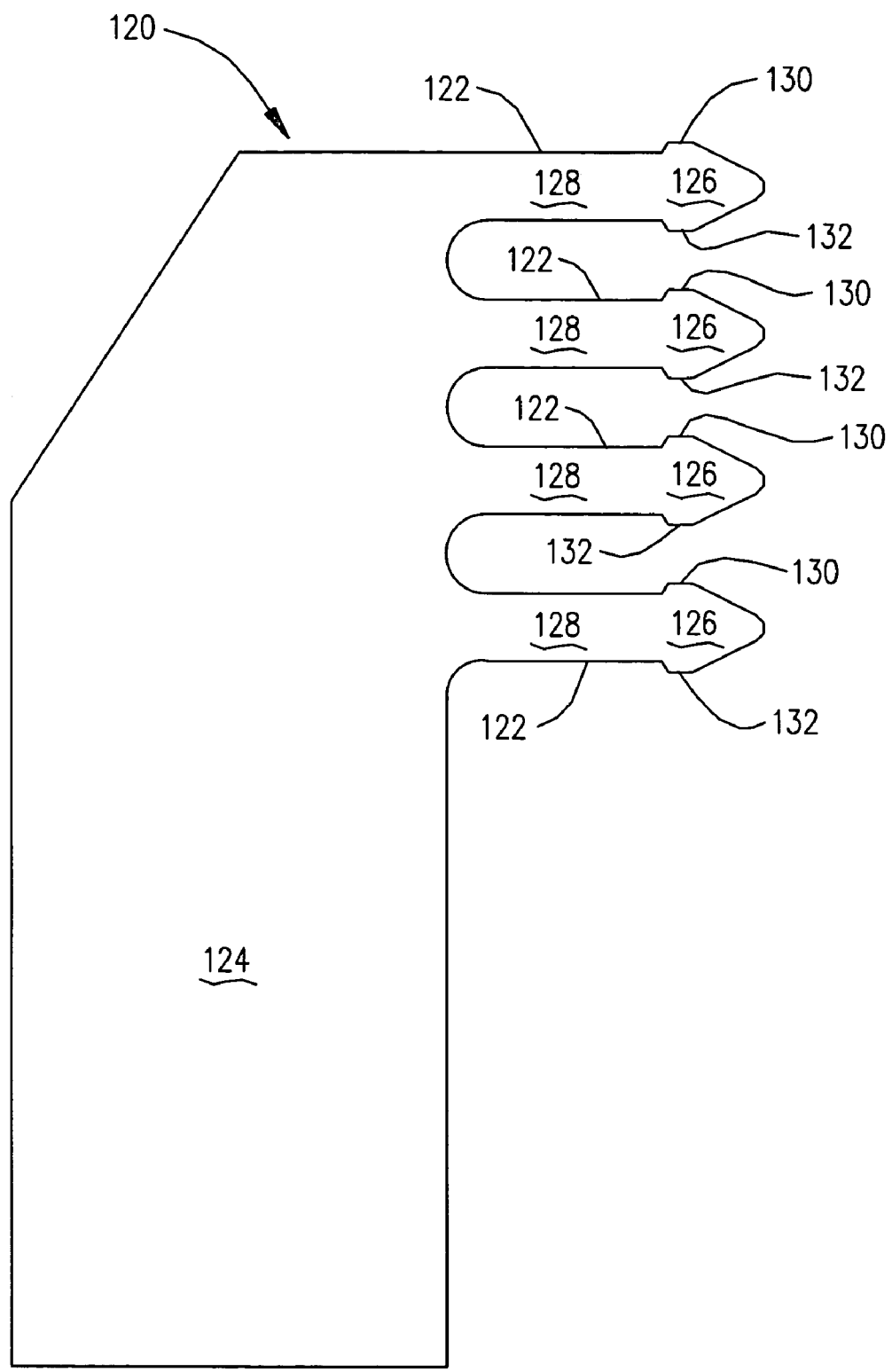
FIG. 2 is an illustration of an embodiment of a head stack comb having fixed comb teeth.

As shown in FIG. 1, a measurement apparatus as schematically illustrated by block 116 is used to measure static parameters of the head or HGA including PSA and RSA. A head stack comb assembly 120 is used to hold suspension arms 108 at a static measurement position to provide an unbiased measurement of the static dimensions of the head or HGA, such as z-height, PSA and RSA. As shown in FIGS. 1-2, prior head stack combs 120 include a plurality of fixed teeth 122 extending from a comb body 124. In the embodiment illustrated in FIG. 2, the teeth 122 have an enlarged wedge shaped tip 126 and a cantilevered portion 128. The teeth 122 include opposed spaced contact surfaces 130, 132 to hold adjacent suspension arms 108 of a head stack assembly 100 for measuring dimensions of the heads 102 or HGA coupled to the suspension arm 108. In particular, in the illustrated embodiment in FIG. 1, the suspension arms 108 include a dimple 133 and the opposed contact surfaces 130, 132 contact the dimple 133 to hold the suspension arms as described.

The wedge shaped tip 126 shown in FIG. 2 facilitates insertion of the teeth 122 of the comb 120 between adjacent suspension arms 108 of the head stack assembly 100. A thickness dimension between the opposed spaced contact surfaces 130, 132 is sized to hold adjacent suspension arms 108 at an elevation or height corresponding to a z-height elevation (or fly height) of the head 102 when merged with or loaded onto the disc 106 of a data storage device. Typically the dimple 133 on the suspension arms 108 rests on the contact surfaces 130, 132 of the teeth 122 to hold the suspension arms 108 to provide an unbiased measurement position for the head 102. Accuracy of the static measurements of the heads 102 is dependent upon accurate alignment of the heads 102 relative to the static measurement position via teeth 122 of comb 120. If the tooth 122 thickness of the comb 120 is not properly dimensioned, measurement accuracy is compromised.

Figure 3:
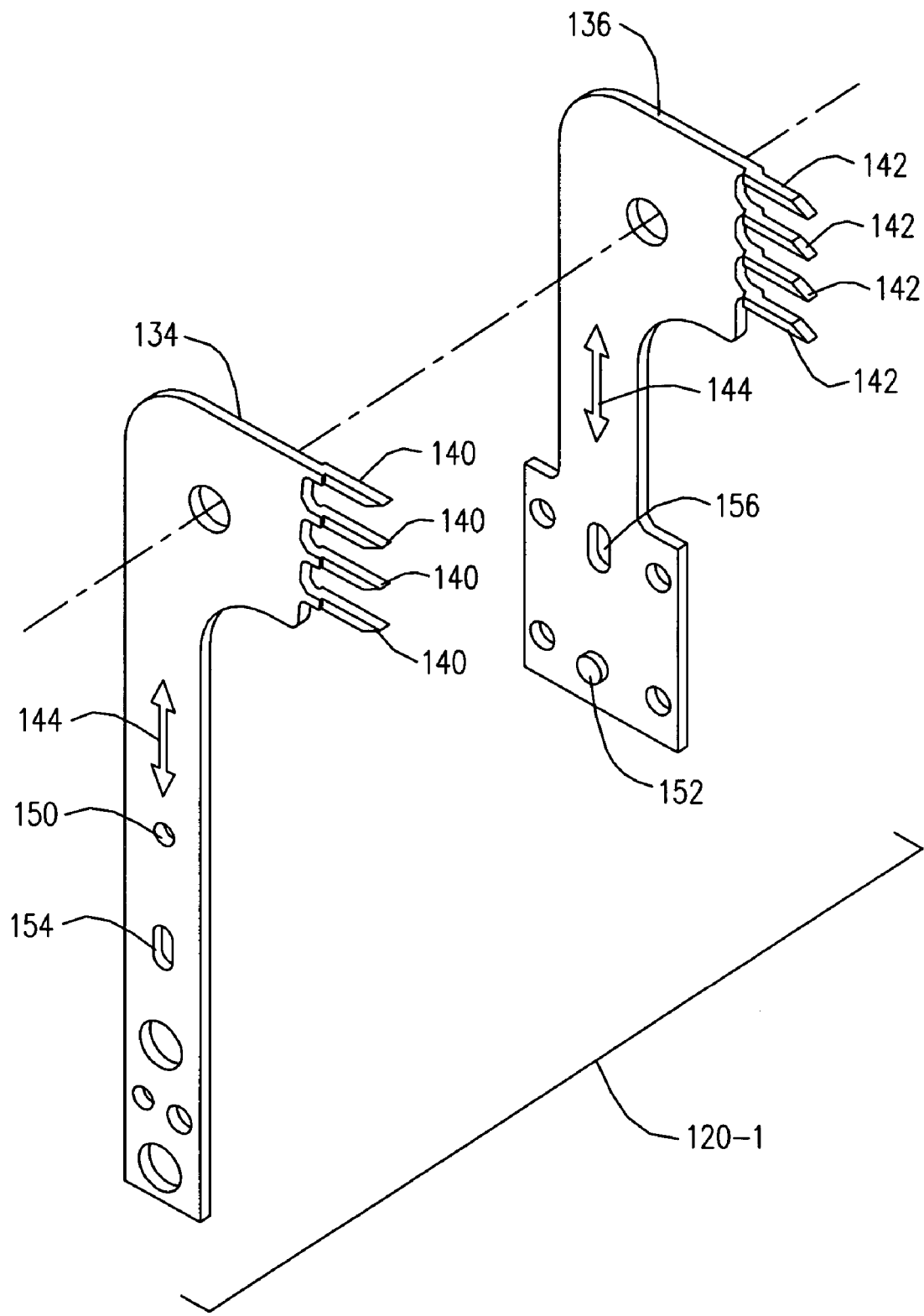
FIG. 3 is an exploded illustration of an embodiment of comb plates of an adjustable head stack comb of the present invention.
Figure 4:
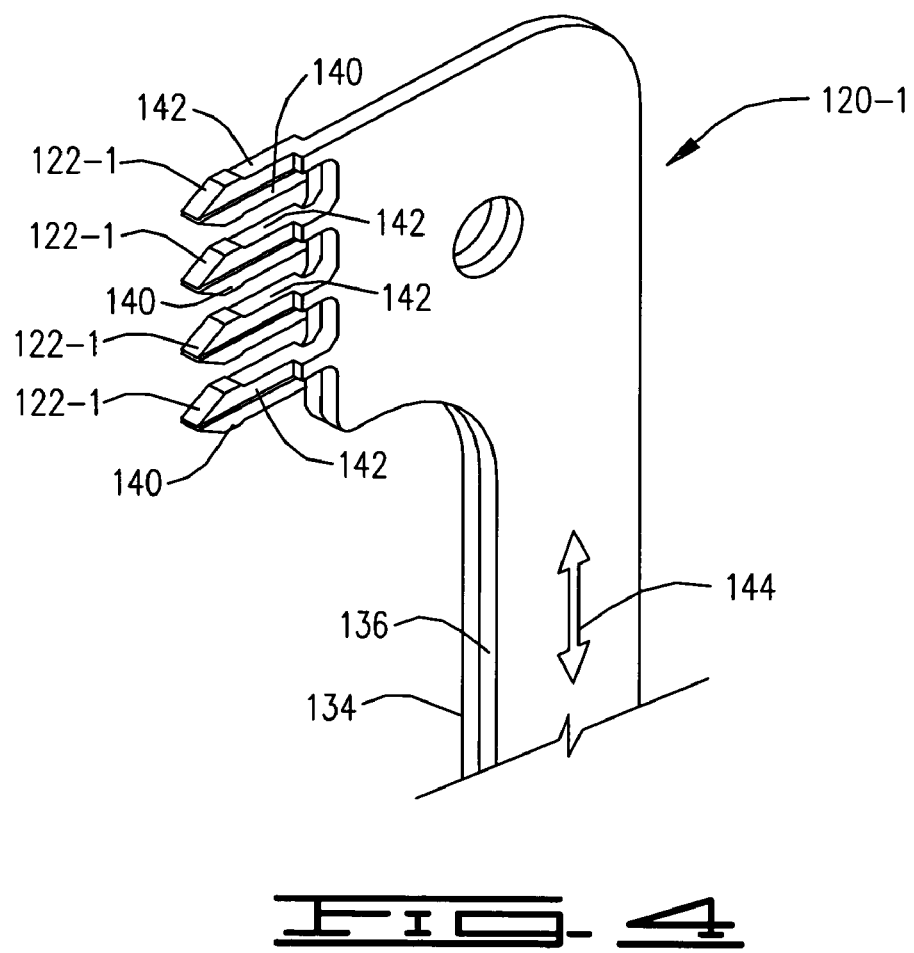
FIG. 4 is a perspective illustration of an embodiment of an adjustable head stack comb including a plurality of comb plates.

FIG. 3 illustrates an embodiment of an adjustable head stack comb 120-1 having an adjustable tooth dimension or thickness. As shown, the comb 120-1 includes a pair of or plurality of comb plates 134, 136 including teeth segments 140, 142. The teeth segments 140, 142 of the comb plates 134, 136 cooperatively form the comb 120-1 and teeth 122-1 of the comb 120-1 as comparatively illustrated in FIGS. 3-4. As shown in FIGS. 3-4, the comb plates 134, 136 are slideably coupled to one another to adjust a position of the teeth segments 140, 142 of the comb plates 134, 136 as illustrated by arrow 144. The relative position of the teeth segments 140, 142 is adjusted to adjust a thickness dimension of the teeth 122-1 cooperatively formed thereby.

In the illustrated embodiment of FIG. 3, the comb plates 134, 136 include pins 150, 152 (face of pin 150 is not visible in FIG. 3) and elongated slots 154, 156, respectively. Pin 150 of comb plate 134 is inserted into slot 156 of comb plate 136 and pin 152 of comb plate 136 is inserted into slot 154 of the comb plate 134 to slidably align comb plates 134, 136 for relative movement. The pins 150, 152 are slidable in slots 154, 156 to facilitate relative movement of the comb plates 134, 136 for adjustment.

Figure 5:
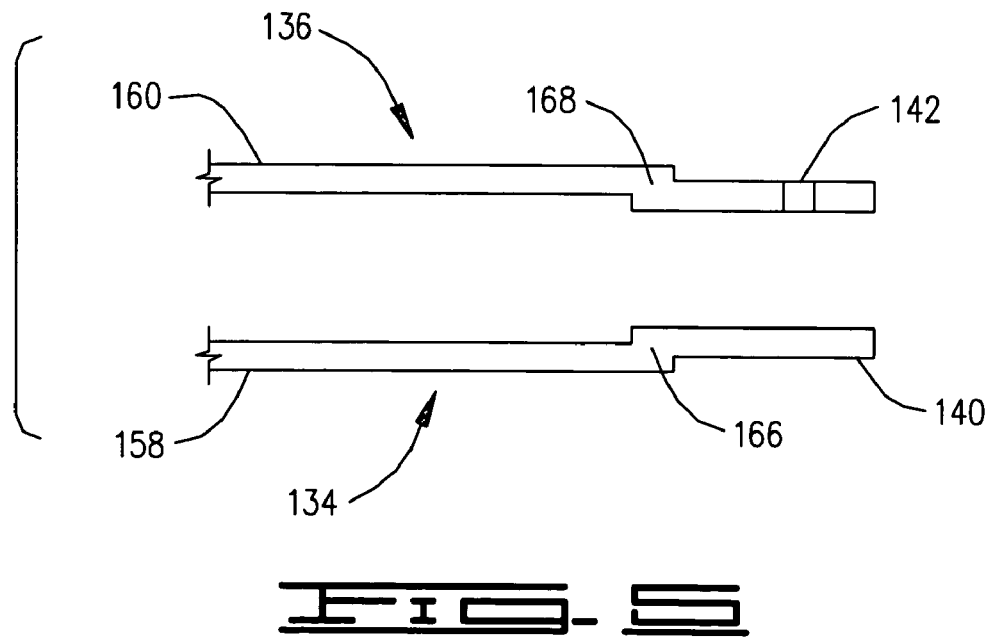

In the illustrated embodiment shown in FIGS. 5-6, the teeth segments 140, 142 of comb plates 134, 136 are cantilevered from a body portion 158, 160 of the comb plates 134, 136 and are offset from the body portion 158, 160 so that the teeth segments 140, 142 overlap to form a comb tooth 122-1 having a narrower width dimension 162 relative to the composition width dimension 164 of the comb plates 134, 136. The narrower width dimension provides a low profile for insertion between suspension arms 108 or for merge relative to a head stack assembly 100. In the illustrated embodiment, the offset teeth segments 140, 142 form steps 166, 168 between the body portions 158, 160 of the comb plates 134, 136 and the teeth segments 140, 142 of the comb plates 134, 136.

FIG. 7 is a detailed illustration of teeth segments 140, 142 which cooperatively form teeth 122-1 of the comb 120-1. As shown, the teeth segments 140, 142 include cantilevered segments 170, 172, which extend from body portions 158, 160 (portion 158 is not visible in FIG. 7) of the comb plates 134, 136. As shown, the cantilevered segments 170, 172 include asymmetrical tapered tips 174, 176 which cooperatively form wedged shaped tips 126-1 of comb teeth 122-1. The asymmetrical shaped tips 174, 176 include a body surface 175 which cooperatively form opposed spaced contact surfaces 130-1, 132-1 of the tooth or teeth 122-1 formed by the comb plates 134, 136. In the illustrated embodiment, body surfaces 175 are relatively flat as shown.

A distance between the surfaces 175 of teeth segments 140, 142 defines a thickness 190 of the tooth 122-1 formed thereby between opposed spaced contact surfaces 130-1, 132-1. The relative distance between the body surfaces 175 is adjusted by adjusting the comb plates 134, 136 to adjust the thickness dimension 190 of teeth 122-1. Thus tooth thickness can be adjusted to hold the suspension arm 108 at a desired position for measurement of static parameters of the head or HGA. In the illustrated embodiment, the comb plates 134, 136 are moved in opposed directions to adjust the tooth thickness of the comb 120-1.

Figure 8:
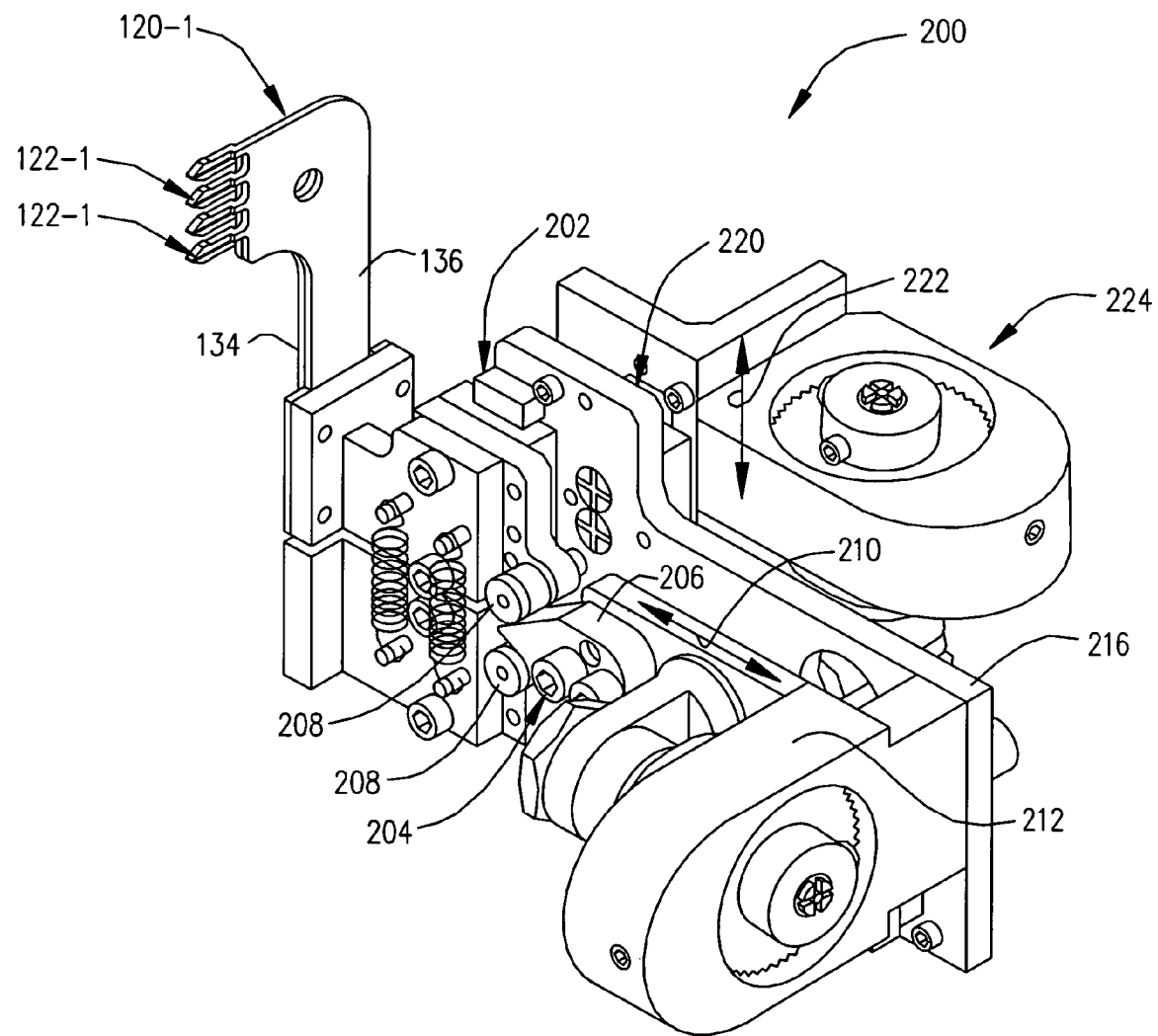
FIG. 8 illustrates an embodiment of a head stack comb assembly including a plurality of comb plates and an adjustment mechanism therefor.

FIGS. 8-9 illustrate an embodiment of an adjustable comb assembly 200 including adjustable comb plates 134, 136 and an adjustment mechanism therefor. In the illustrated embodiment, the adjustment mechanism includes a comb plate slide assembly 202 to slidably adjust a relative position of comb plates 134, 136 via operation of a camming assembly 204. The camming assembly 204 includes a wedge shaped cam 206 which engages cam followers 208 of the slide assembly 202. The wedge shape cam 206 of the camming assembly 204 is moved along a camming stroke as illustrated by arrow 210 by indexer or driver 212 to incrementally move comb plates 134, 136 to adjust a thickness dimension 190 between opposed contact surfaces 130-1, 132-1 of the tooth 122-1 formed thereby.

In the illustrated embodiment, the slide assembly 202 and camming assembly 204 are coupled to a movable assembly block 216. The movable assembly block 216 is coupled to an assembly slide assembly 220 movable along an assemble stroke as illustrated by arrow 222 to cooperatively adjust an elevation or overall height of the comb 120-1. As shown, the assembly block 216 is moved along the assembly stroke as illustrated by arrow 222 via driver or indexer 224. Thus, in the particular embodiment illustrated, the relative position of the comb plates 134, 136 is adjusted by the camming assembly 204 to adjust tooth thickness of the comb. The position or elevation of the comb plates 134, 136 is cooperatively adjusted via assembly slide 220 and driver or indexer 224 to adjust the z-height or elevation of the comb 120-1.

FIG. 9 illustrates an exploded view of the adjustable comb assembly of FIG. 8 where like numbers are used to refer to like parts in the previous FIGS. As shown, the comb plate slide assembly 202 includes slide cars 230, 232 movable along rail 234 fixed to assembly block 216. Comb plates 134, 136 are coupled to the slide cars 230, 232 via "T" shaped comb blocks 236, 238 which form transverse mounting surfaces for the comb plates 134, 136 and slide cars 230, 232.

Comb plate 134 is mounted to mounting surface 240 of block 236 via fasteners 242 and comb plate 136 is mounted to mounting surface 244 of block 238 via fasteners 246 (in the embodiment shown, fasteners 246 include four button head screws). Comb plate 134 is aligned relative to mounting surface 240 of block 236 via dowel pins (not shown). In particular in the illustrated embodiment first and second dowel pins (not shown) are press fit on surface 240 of block 236. The first dowel pin (not shown) extends into hole 247 of comb plate 134 and the second pin (not shown) extends into slot 248 of comb plate 134. Slot 248 has an elongate dimension relative to the dowel pin (not shown) to adjust the position of the comb plate 134 relative to block 236 for alignment of the comb plates 134, 136. As previously described, the comb plates 134, 136 are slidably aligned so that pins 150, 152 of the comb plates 134, 136 extend into slots 154, 156 of the comb plates 134, 136 as previously described with respect to FIG. 3.

The "T" shaped comb blocks 236, 238 are coupled to the slide cars 230, 232 through camming blocks 250, 252 to movably support the comb plates 134, 136 to move in opposed directions relative to one another to increase or decrease tooth thickness 190 formed by teeth segments 140, 142. As shown, camming blocks 250, 252 are coupled to slide cars 230, 232 via fasteners 253 and comb blocks 236, 238 are coupled to camming blocks 250, 252 along transverse mounting portions via fasteners 255 to form multiple slides to adjust comb plates 134, 136. Cam followers 208 are coupled to the camming blocks 250, 252 to actuate or move camming blocks 250, 252 coupled to slide cars 230, 232 to move comb plates 134, 136 to adjust the position of the comb plates 134, 136 as described.

As shown, the comb plates 134, 136 are biased towards one another in a reference position via springs 260 which extend between posts 262 coupled to camming blocks 250, 252. The comb plates 134, 136 are moved against the biased position (or closed position) via the camming wedge 206 which supplies a biasing force to cam followers 208 on the camming blocks 250, 252 to separate or move the comb plates 134, 136 in opposed directions to increase or decrease separation between the teeth segments 140, 142 to adjust the thickness dimension 190 of the comb teeth 122-1 formed thereby as previously described.

In particular, in the illustrated embodiment, posts 262 are coupled to camming blocks 250, 252 and extend through openings of comb blocks 236, 238 to align the comb blocks 236, 238 relative to the camming blocks 250, 252. Posts 262-1 and 262-2 extend through hole 263 and slot 264 on block 238 to provide a fixed position in both an x and y direction or interface. Posts 262-3 and 262-4 extend through slots 264 (two slots shown in the illustrated embodiment) on block 236 to provide a fixed position in a vertical direction or y direction and compliance in a horizontal direction or x direction to orient block 236 to properly align comb plate 134 relative to comb plate 136 to provide a sliding contact without binding or slack due to thickness tolerances of the comb plates 134, 136.

As previously discussed, the camming wedge 206 is movably supported relative to a cam actuator. The cam actuator includes an actuator block 266 coupled to an actuator slide 268 movable along rail 270 fixed to the assembly block 216. Wedge 206 is coupled to actuator block 266 which is movable via an indexer or driver 212 (illustrated schematically in FIG. 9) coupled to the actuator block 266 via bushing 272 to move the camming wedge 206 along an actuation stroke to engage cam followers 208 to adjust the position of the comb plates 134, 136 as previously described.

In the illustrated embodiment, a height or elevation of the comb plates 134, 136 is cooperatively adjusted via assembly driver or indexer 224 coupled to assembly block 216. The assembly block 216 is coupled to slide 274 movable along rail 276 fixed to a base 278. The driver or indexer 224 is coupled to the assembly block 216 via bushing 279 to move the assembly block 216 along rail 276 to adjust the height or elevation of the comb plates 134, 136. Thus, as described, dimensions of the comb 120-1 for example the overall height of the comb 120-1 and comb teeth 122-1 can be adjusted as described. Although FIGS. 7-8 illustrate a particular adjustment mechanism, application of the present invention is not limited to the particular embodiment shown.

The illustrated embodiment includes reference alignment slots to provide a reference alignment for comb plates 134, 136 and assembly block 216. As shown, in the illustrated embodiment, the camming blocks 250, 252 include reference holes 280 (hidden on camming block 250 in FIG. 9) and assembly block 216 includes references slots 282 to align the camming blocks 250, 252 via an inserted rod (not shown) relative to the assembly block 216. The comb plates 134, 136 are aligned relative to camming blocks 250, 252 via posts 262. Also as shown, the assembly block 216 includes a reference hole 284 to align the assembly block 216 relative to a reference slot 286 of base 278.

The illustrated comb assembly can be used with a measurement apparatus such as the Optoflex E96 machine by Marposs (www.marposs.com) to measure alignment of heads 102 of a head stack assembly 100. The comb assembly is mounted to the measurement apparatus relative to L shaped base 278. The Marposs apparatus uses non-contact sensors or shadow casting measurement techniques. In the illustrated embodiment, comb block 238 includes a notched segment 292 to reduce shadow interference for measurement.

Figure 10A:
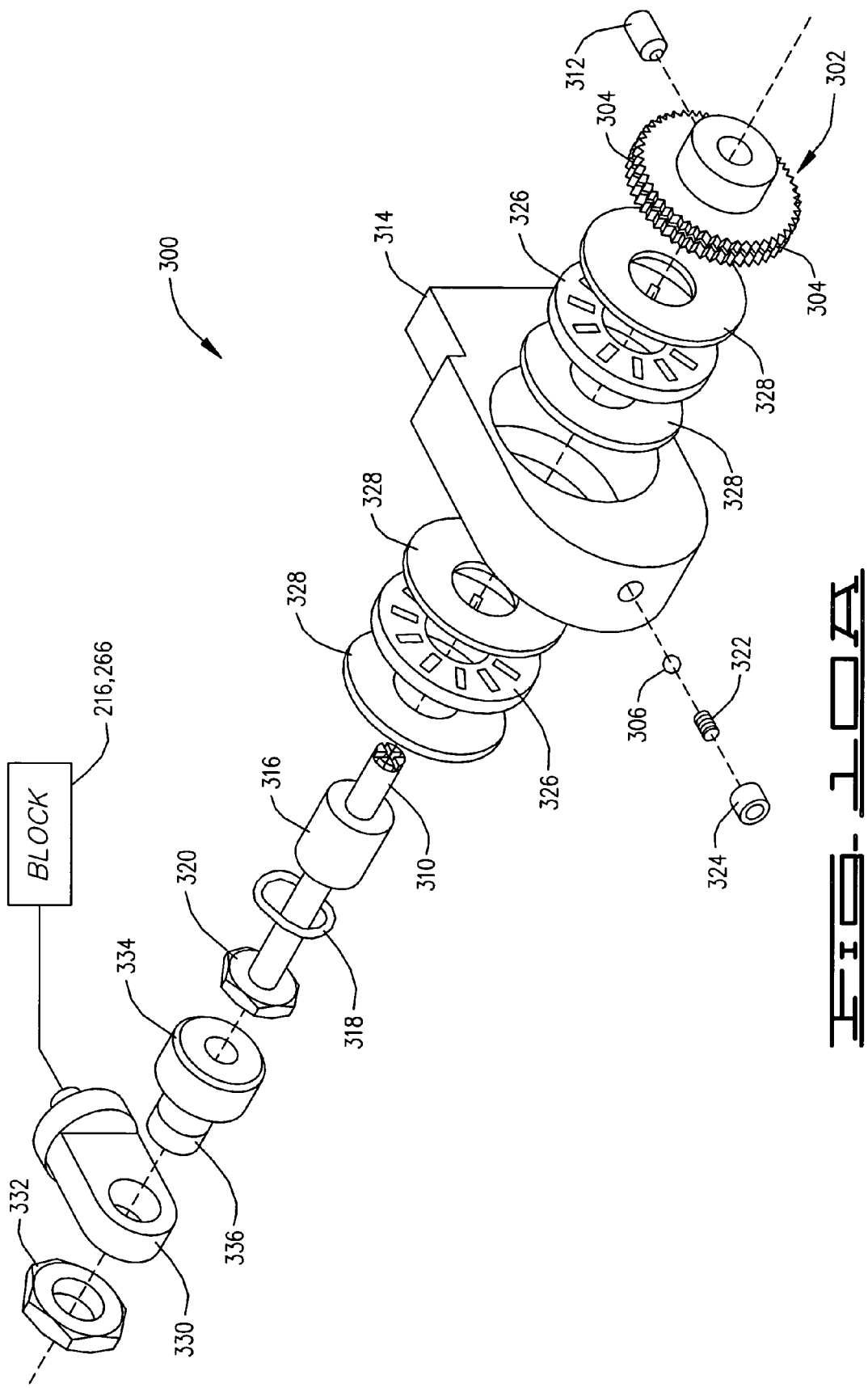
FIG. 10-A is an exploded illustration of an indexer to incrementally adjust comb plates of an adjustable head stack comb.
Figure 10B:
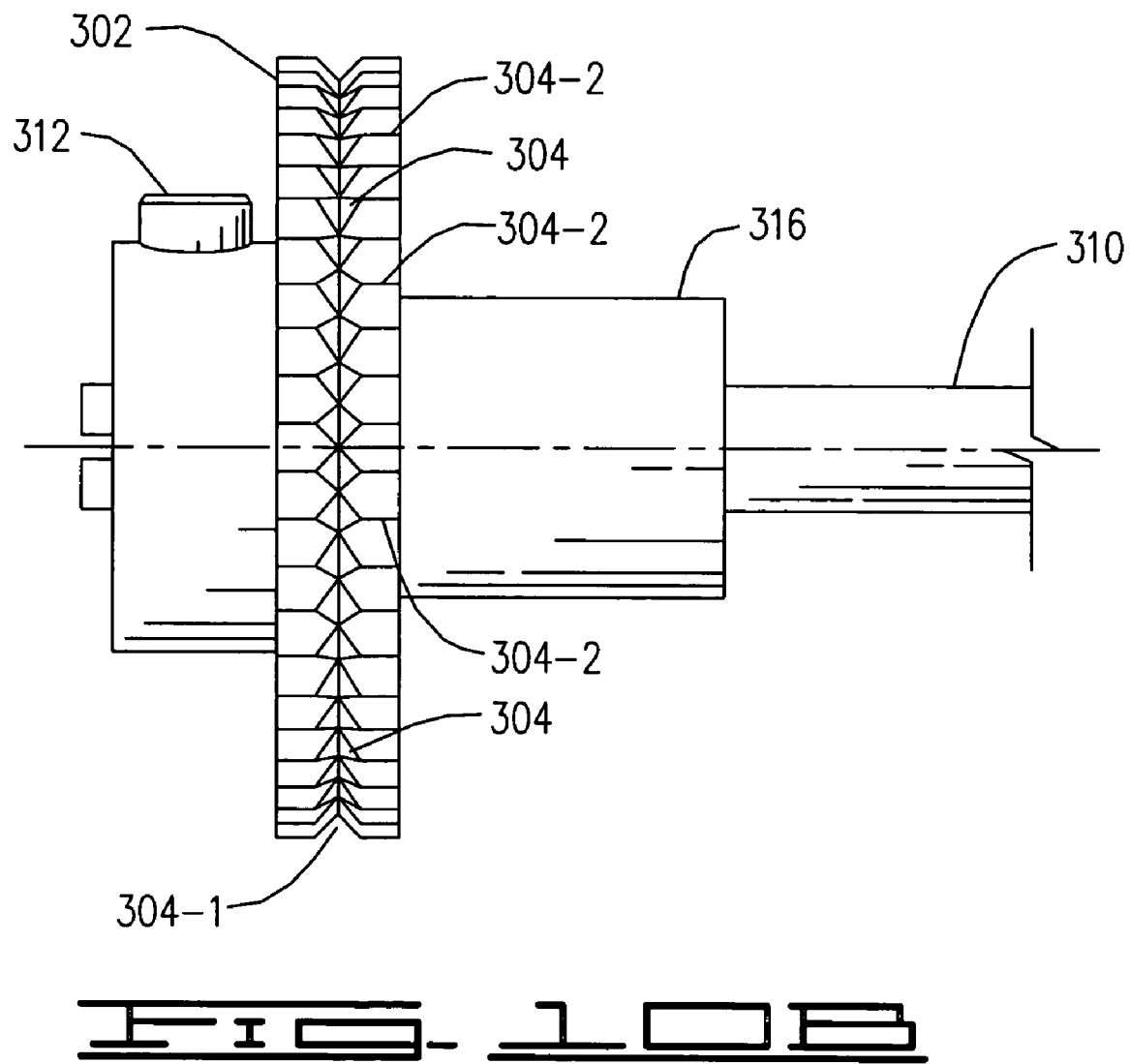
Figure 10C:
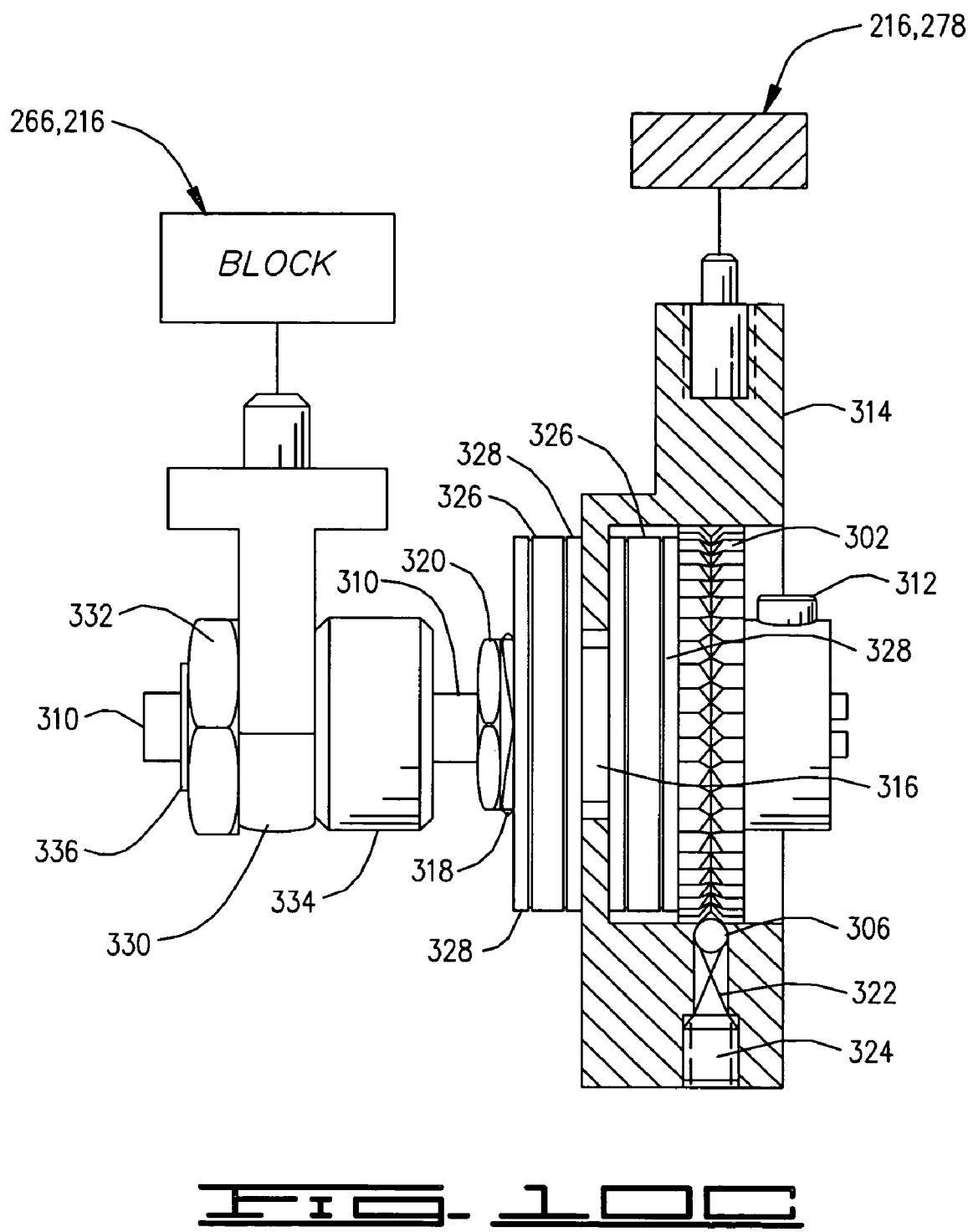

FIGS. 10-A through 10-C illustrate an embodiment of an indexer 300 for incrementally adjusting the comb parameters or dimensions. In the embodiment illustrated in FIGS. 10-A and 10-B, the indexer 300 includes a notched indexer cylinder 302 including a plurality of intersecting 90 degree equally spaced "V" shaped notches 304 about a perimeter thereof. The intersecting "V" shaped notches 304 form "V" shaped nests for a spring loaded ball 306 which is biased relative to the intersecting "V" shaped notches 304 about the perimeter of the indexer cylinder 302. The indexer cylinder 302 is mounted on a precision screw 310 and locked in place relative to the precision screw 310 via set screw 312. The indexer cylinder 302 is assembled in housing 314 with sleeve 316 as illustrated in FIGS. 10-A through 10-C.

FIG. 10-B is a detailed illustration of the intersecting "V" shaped notches 304 of the indexer cylinder 302. As shown, the notches are formed via a "v" shaped notch 304-1 orientated in a first direction about an outer perimeter of the indexer cylinder 302. Thereafter a plurality of "v" shaped notches 304-2 orientated in a second direction 90 degrees from notch 304-1 are spaced about the perimeter of the indexer cylinder 302 to form the "V" shaped nest to incrementally adjust the position of the comb plates 314, 316 by a known incremental distance.

As shown, ball 306 is biased relative to the indexer cylinder 302 via spring 322 and set screw 324 extending through a hole of the indexer housing 314. Ball 306 seats in the nests and the cylinder 302 is rotated to incrementally advance ball 306 to an adjacent nests to move actuator block 266 or assembly block 216 in incremental steps defined by the nests of the cylinder 302. As shown, the assembly includes a plurality of thrust bearings 326 and washers 328 interposed between the indexer cylinder 302 and wave washer 318 and nut 320. Thrust bearings 326 and washers 328 are loaded on and extend about sleeve 316 which is dimensioned to limit float of the bearings 326 and washers 328. A connector 330 is coupled to the precision screw 310 via nut 332 and no backlash nut 334 through a bronze bushing 336 for angular compliance. Connector 330 is coupled to the actuator block 266 to move the actuator block 266 and camming wedge 206 to adjust the position of the comb plates 134, 136 in an illustrated embodiment or alternately connector 330 is coupled to assembly block 216 to adjust an elevation of the comb plates 134, 136 as previously described. As shown with respect to FIG. 9, fastener 340 extends through L shaped base 278 to mount the indexer 224 to base 278 and fastener 342 mounts indexer 212 to block 216 as schematically illustrated.

To adjust the comb plates 134, 136, indexer cylinder 302 and precision screw 310 are rotated clockwise and counter-clockwise to linearly move the backlash nut 334 back and forth in small click steps. The connector 330 is engaged to the backlash nut 334 via bushing 336 to move in incremental steps via rotation of the indexer cylinder 302. The precision screw 310 and indexer cylinder 302 are rotated in increment steps or clicks via engagement of the spring loaded precision ball 306 in the "V" shaped notches or nests 304 about the perimeter of the indexer cylinder 302. In an illustrated embodiment, the precision screw is a 8-80 (80 threads per inch) screw. In an illustrative embodiment, the indexer cylinder 302 includes 50 intersecting "V" shaped notches to provide an index stroke of 1/(80*50)=0.00025 inches.

Preferably, camming wedge 206 includes a 60 degree wedge angle which provides an adjustment of 0.000125 inches for each comb plate 134, 136 for a 0.00025 index stroke based upon 0.00025*sin 30 degree=0.000125 inches. The stroke increment can be modified by adjusting the wedge angle or index increment of the indexer cylinder 302 and application is not limited to the specific embodiment disclosed. Although FIGS. 10-A through 10-C illustrate a particular indexer embodiment, application is not limited to the particular embodiment shown. For example, in alternative embodiments, the comb plates 134, 136 can be adjusted via a servo motor, stepper motor or other actuation devices.

FIG. 11 illustrates a flow chart illustrating process steps for adjusting comb parameters, such as tooth 122-1 thickness. As illustrated by step 350, the position of the comb plates 134, 136 is slideably adjusted. For example, in one illustrated embodiment described, the comb plates 134, 136 are separately mounted on a slide assembly 202 including multiple independently adjustable slide cars 230, 232. The slider cars 230, 232 are movable in opposed directions to increase or decrease tooth thickness or comb dimensions. In illustrated embodiments, a height elevation of the comb plates 134, 136 is adjusted by cooperatively adjusting an elevation of the comb plates 134, 136. Although illustrated embodiments show moving the comb plates 134, 136 in opposed directions to adjust the relative position of the comb plates, and providing multiple actuation systems to adjust the relative position and elevation or overall height of the comb plates 134, 136, application of the present invention is not so limited. Thereafter as illustrated by step 352, the tooth 122-1 or teeth 122-1 formed the comb plates 134, 136 are merged relative to a head stack assembly 100.

In the illustrated embodiment of FIG. 11, the adjustable comb as described has application for automated measurement of head stack assemblies 100 using a Marposs apparatus. For measurement, the head stack assembly 100 is loaded into an assembly nest and the head stack assembly 100 is clocked or aligned for measurement. The clocked head stack assembly is clamped and a shipping or first comb is removed after the adjustable head stack comb is inserted or merged for measurement. As previously described, the comb plates 134, 136 of the adjustable head stack comb 120-1 are adjusted to hold the suspension arms 108 at an optimum position for measurement.

The adjustable comb as described allows for iterative determination of optimum tooth height and thickness dimensions for accurate head measurements without expensive fabrication of fixed tooth combs. The adjustable comb allows for dimension adjustments to compensate for part to part variations. The adjustable head stack comb of the present invention can also be used to measure PSA and RSA at a variety of z-heights to derive a measurement standard or correction algorithms for various measurement instruments.

In an embodiment illustrated in FIG. 12, the head stack comb is adjusted to provide a narrow thickness dimension for teeth of the comb prior to inserting and merging teeth of the comb relative to head stack assemblies as illustrated by block 360. Following insertion or merge, the teeth of the adjustable comb are adjusted to increase the thickness dimension as illustrated by block 362. As illustrated by block 364, comb plates are adjusted to reduce the thickness of the teeth to withdraw the teeth from the head stack assembly as illustrated by block 366. Adjustment of the tooth thickness for merge or demerge provides a zero insertion or withdrawal force and can be used to hold suspension arms 108 of head stack assemblies 100 for insertion or withdraw of head stack shipping combs although application is not so limited to the particular applications described. In particular, in an illustrated embodiment, the shipping comb is inserted (merged) or withdrawn (demerged) between steps 362 and 364 of FIG. 12.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to an adjustable head stack comb for application for measurement, it will be appreciated by those skilled in the art that the teachings of the present invention is not limited to the particular use and the adjustable head stack comb can be used for other applications, such as holding suspension arms for insertion or withdrawal of a shipping comb without departing from the scope and spirit of the present invention.

What is claimed is:

1. An apparatus comprising:
   a first comb plate coupled to a first slide assembly movable along a rail that is, in turn coupled to a block, the first comb plate including at least one tooth segment;
   a second comb plate coupled to a second slide assembly that is movable along the rail, and thereby movably disposed relative to the first comb plate and the second comb plate including at least one tooth segment, the first and second comb plates cooperatively forming a comb and the at least one tooth segment of the first comb plate and the at least one tooth segment of the second comb plate cooperatively forming a comb tooth; and
   a cam assembly including a camming wedge and a device to move the camming wedge along an actuation stroke to adjust a relative position of the first and second comb plates to adjust a thickness dimension of the comb tooth, the camming wedge including a first surface and a second surface, the first surface configured to engage a first cam follower coupled to the first comb plate and the first slide assembly, the second surface configured to engage a second cam follower coupled to the second comb plate and the second slide assembly to move the first and second comb plates in opposed directions to increase or decrease the thickness dimension of the comb tooth wherein the first and second slide assemblies include at least one alignment hole or slot and the block includes first and second alignment holes or slots to align the first and second slide assemblies relative to the block.

2. The apparatus of claim 1 wherein the first comb plate includes a pin and the second comb plate includes an elongate slot and the pin of first comb plate is slidably disposed in the elongate slot of the second comb plate.

3. The apparatus of claim 2 wherein the second comb plate includes a pin slideably disposed in an elongate slot of the first comb plate.

4. The apparatus of claim 1 wherein the at least one tooth segments of the first and second comb plates include body surfaces which cooperatively form opposed spaced contact surfaces of the comb tooth having an adjustable thickness dimension between the contact surfaces.

5. The apparatus of claim 1 wherein the at least one tooth segments of the first and second comb plates include asymmetrically tapered tips to cooperatively form a wedge shaped tip of the comb tooth formed by the at least one tooth segments of the first and second comb plates.

6. The apparatus of claim 1 wherein the first and second comb plates include a plurality of spaced tooth segments to form a plurality of comb teeth.

7. The apparatus of claim 1 wherein the device to move the camming wedge is an indexer.

8. The apparatus of claim 7 wherein the indexer includes an indexing device that moves the camming wedge an incremental distance in incremental steps.

9. The apparatus of claim 1 wherein the first and second slide assemblies are spring biased relative to a closed position and movable thereagainst increase the thickness dimension of the comb tooth.

10. The apparatus of claim 1 further comprising
    a head stack assembly including at least one suspension arm having a head coupled thereto.

11. The apparatus of claim 1 wherein the camming wedge includes a "V" shaped tip configured to engage the first and second cam followers.

12. The apparatus of claim 1 wherein the at least one tooth segment of the first comb plate and the at least one tooth segment of the second comb plate are cantilevered from, and offset from, body portions of the first and second comb plates to provide a first width dimension for the first and second comb plates along the body portions of the comb plates and a second narrow width dimension along the comb tooth formed by the at least one tooth segments of the first and second comb plates.

13. The apparatus of claim 1 wherein the first slide assembly includes a first cam block and the first comb plate is coupled thereto, and the second slide assembly includes a second cam block and the second comb plate is coupled thereto, and the first cam follower is coupled to the first cam block and the second cam follower is coupled to the slot, on the first and second slide second cam block and the at least one alignment hole or slot on the first and second slide assemblies is formed on the first and second cam blocks.

14. An apparatus comprising
    a first comb plate coupled to a first slide assembly that is movable along a first rail that is, in turn coupled to a block, the first comb plate including at least one tooth segment;
    a second comb plate coupled to a second slide assembly that is movable along the first rail, and thereby movably disposed relative to the first comb plate, the second comb plate including at least one tooth segment, the first and second comb plates cooperatively forming a comb, the at least one tooth segment of the first comb plate and the at least one tooth segment of the second comb plate cooperatively forming a comb tooth;
    a cam assembly including a camming wedge movable along an actuation stroke and a device to move the camming wedge along the actuation stroke and the camming wedge configured to engage a first cam follower coupled to the first comb plate and the first slide assembly and a second cam follower coupled to the second comb plate and the second slide assembly to operably move the first and the second comb plates apart from each other in one direction of the actuation stroke and alternatively toward each other in another direction of the actuation stroke to adjust a thickness dimension of the comb tooth; and
    a third slide assembly to which the block is affixed, the third slide assembly being movably disposed on a second rail that is, in turn, coupled to a base so that the block is moveable in relation to the base to operably move the first and second comb plates to adjust an elevation height of the first and second comb plates;
    first alignment features including an alignment hole or slot on the first and second slide assemblies and alignment holes or slots on the block to align the first and second slide assemblies relative to the block; and
    second alignment features including an alignment slot or hole on the block and an alignment hole or slot on the base to align the block relative to the base.

15. The apparatus of claim 14 wherein the first slide assembly includes a first cam block and the second slide assembly includes a second cam block wherein the first and second cam followers are supported by the first and second cam blocks respectively, and the first and second cam blocks include the alignment holes or slots to align the first and second cam blocks relative to the block.

16. The apparatus of claim 14 and comprising:
a device configured to selectively move the block relative to the base.

17. An assembly comprising:
a first comb plate including at least one tooth segment;
a second comb plate slideably disposed relative to the first comb plate and the second comb plate including at least one tooth segment, the first and second comb plates cooperatively forming a comb and the at least one tooth segment of the first comb plate and the at least one tooth segment of the second comb plate cooperatively forming a comb tooth;
a cam assembly including a camming wedge movable along an actuation stroke and configured to engage a first cam follower coupled to the first comb plate and a second cam follower coupled to the second comb plate to move the first and the second comb plates in opposed directions to increase or decrease a thickness of the comb tooth; and
an indexer configured to move the camming wedge along the actuation stroke wherein the indexer includes a cylinder having a plurality of "V" shaped nests about a circumference thereof and a spring loaded ball, which is movable between adjacent nests, to move the camming wedge in increment steps.

18. The assembly of claim 17 wherein the spring loaded ball is movable between the adjacent nests via rotation of the cylinder.

\* \* \* \* \*

UNITED STATES PATENT AND TRADEMARK OFFICE
CERTIFICATE OF CORRECTION

PATENT NO. : 7,644,493 B2  Page 1 of 1
APPLICATION NO. : 10/884210
DATED : January 12, 2010
INVENTOR(S) : Nayar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 624 days.

Signed and Sealed this

Twenty-first Day of December, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,644,493 B2 | Page 1 of 1 |
| APPLICATION NO. | : 10/884210 | |
| DATED | : January 12, 2010 | |
| INVENTOR(S) | : Sham S. Nayar et al. | |

It is certified that error appears in the above-identified patent and that said Letters Patent is hereby corrected as shown below:

Column 9,

Line 60, delete "thereagainst increase" and insert --thereagainst to increase--

Column 10,

Lines 16-17, delete "slot, on the first and second slide"

Line 65, delete "respectively, and the" and insert --respectively, the--

Signed and Sealed this

Twenty-second Day of March, 2011

David J. Kappos
*Director of the United States Patent and Trademark Office*